United States Patent
Bechtel et al.

(10) Patent No.: US 8,239,228 B2
(45) Date of Patent: Aug. 7, 2012

(54) SYSTEM FOR VALUATING USERS AND USER GENERATED CONTENT IN A COLLABORATIVE ENVIRONMENT

(75) Inventors: Michael E. Bechtel, Naperville, IL (US); Brian J. Leslie, Chicago, IL (US)

(73) Assignee: Accenture Global Services Limited, Dublin (IE)

( * ) Notice: Subject to any disclaimer, the term of this patent is extended or adjusted under 35 U.S.C. 154(b) by 389 days.

(21) Appl. No.: 12/474,468

(22) Filed: May 29, 2009

(65) Prior Publication Data
US 2009/0259526 A1    Oct. 15, 2009

Related U.S. Application Data

(63) Continuation-in-part of application No. 12/036,001, filed on Feb. 22, 2008.

(51) Int. Cl.
*G06Q 10/00* (2012.01)
(52) U.S. Cl. ............................................. 705/7
(58) Field of Classification Search .................. None
See application file for complete search history.

(56) References Cited

U.S. PATENT DOCUMENTS

| | | | |
|---|---|---|---|
| 5,878,214 | A | 3/1999 | Gilliam et al. |
| 7,899,694 | B1 | 3/2011 | Marshall et al. |
| 7,953,720 | B1 | 5/2011 | Rohde et al. |
| 2002/0075320 | A1 | 6/2002 | Kurapati |
| 2005/0060222 | A1 | 3/2005 | White |
| 2005/0177388 | A1 | 8/2005 | Moskowitz et al. |
| 2005/0228983 | A1 | 10/2005 | Starbuck et al. |
| 2006/0121434 | A1 | 6/2006 | Azar |
| 2007/0078670 | A1 | 4/2007 | Dave et al. |
| 2007/0143281 | A1 | 6/2007 | Smirin et al. |
| 2007/0288416 | A1 | 12/2007 | Ferguson et al. |
| 2008/0120339 | A1 * | 5/2008 | Guan et al. ................. 707/104.1 |
| 2008/0133671 | A1 | 6/2008 | Kalaboukis |
| 2008/0222279 | A1 | 9/2008 | Cioffi et al. |

FOREIGN PATENT DOCUMENTS

| | | |
|---|---|---|
| EP | 1 286 276 A1 | 2/2003 |
| EP | 1286276 A1 | 2/2003 |
| WO | WO 2004/097627 A2 | 11/2004 |

OTHER PUBLICATIONS

European Search Report for European Patent Application No. EP 09002450 dated Jul. 20, 2009.
First Examiner's Report from the Canadian Patent Office for Canadian Patent Application No. 2,652,734 dated Mar. 7, 2012.
United States Patent and Trademark non-final Office Action dated Feb. 17, 2012 for co-pending U.S. Appl. No. 12/707,464.

\* cited by examiner

*Primary Examiner* — Shay S Glass
(74) *Attorney, Agent, or Firm* — Brinks Hofer Gilson & Lione

(57) ABSTRACT

A system for valuating users and user generated content in a collaborative environment is described. The system may include a memory, an interface, and a processor. The memory may store an item, responses to the item, and ratings for each response. The processor may receive responses from the users based on the item provided by the content provider. The processor may receive ratings from the users for each of the responses. The processor may determine a response quality score for each response if the number of users who viewed the response satisfies a view threshold. The response quality score may be based on the ratings received for each response and the number of users who viewed each response. The processor may transform each response and the response quality score of each response into a graphical representation and may provide the graphical representation to the content provider.

23 Claims, 11 Drawing Sheets

SYSTEM FOR VALUATING USERS AND USER GENERATED CONTENT IN A COLLABORATIVE ENVIRONMENT

CROSS-REFERENCE TO RELATED APPLICATIONS

This application is a continuation-in-part of U.S. patent application Ser. No. 12/036,001, filed on Feb. 22, 2008, which is incorporated by reference herein.

TECHNICAL FIELD

The present description relates generally to a system and method, generally referred to as a system, for valuating users and user generated content in a collaborative environment, and more particularly, but not exclusively, to valuating users and user responses in a collaborative review system in order to identify the most valuable users and the most valuable user responses.

BACKGROUND

Collaborative environments may allow users to cooperatively build off an initial topic by structuring and restructuring the topic. The initial topic may continually evolve as additional users provide insight to the topic. The final result may be a representation of the group knowledge over a period of time. However, collaborative environments may assume that the insight and knowledge of all the users is equal. Collaborative environments systems may be unable to properly account for users of varying knowledge and expertise on a given topic.

SUMMARY

A system for valuating users and user generated content in a collaborative environment may include a memory, an interface, and a processor. The memory may be connected to the processor and the interface and may store an item, responses to the item, and ratings for each response. The interface may communicate with devices of users and a content provider. The processor may receive responses from the users based on the item provided by the content provider. The processor may receive ratings from the users for each of the responses. The processor may determine a response quality score for each response if the number of users who viewed the response satisfies a view threshold. The response quality score may be based on the ratings received for each response and the number of users who viewed each response. The processor may transform each response and the response quality score of each response into a graphical representation and may provide the graphical representation to the content provider.

Other systems, methods, features and advantages will be, or will become, apparent to one with skill in the art upon examination of the following figures and detailed description. It is intended that all such additional systems, methods, features and advantages be included within this description, be within the scope of the embodiments, and be protected by the following claims and be defined by the following claims. Further aspects and advantages are discussed below in conjunction with the description.

BRIEF DESCRIPTION OF THE DRAWINGS

The system and/or method may be better understood with reference to the following drawings and description. Non-limiting and non-exhaustive descriptions are described with reference to the following drawings. The components in the figures are not necessarily to scale, emphasis instead being placed upon illustrating principles. In the figures, like referenced numerals may refer to like parts throughout the different figures unless otherwise specified.

DETAILED DESCRIPTION

Figure 1:
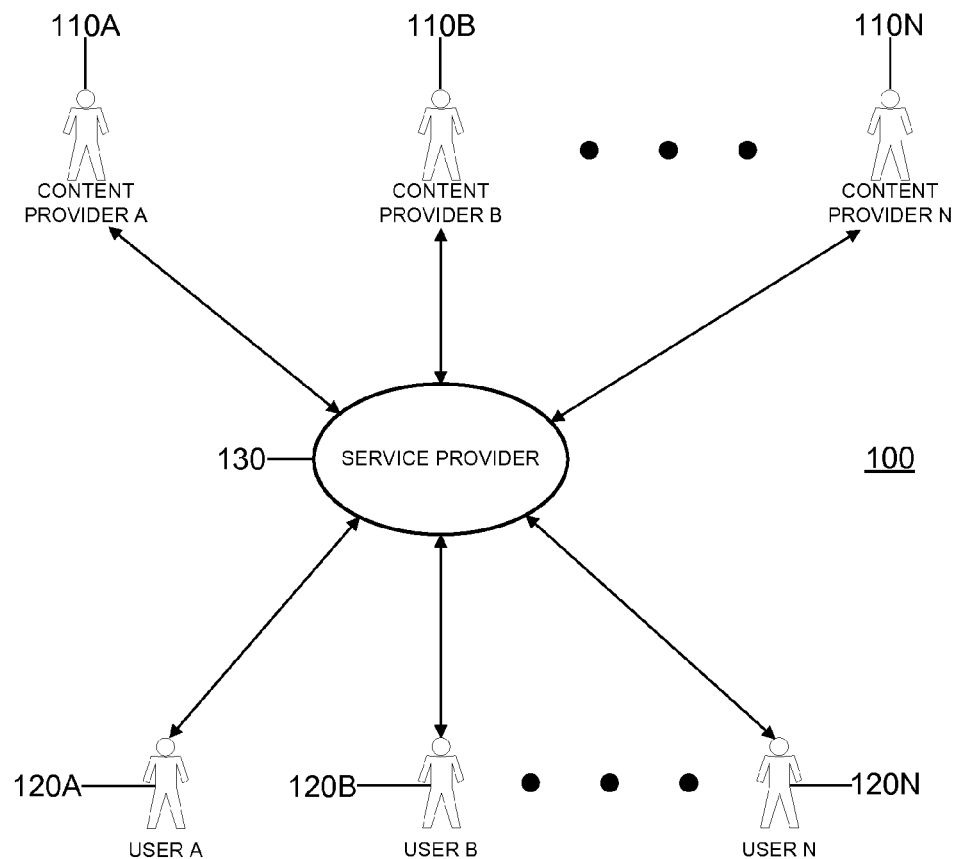
FIG. 1 is a block diagram of a general overview of a system for valuating users and user generated content in a collaborative environment.

A system and method, generally referred to as a system, may relate to valuating users and user generated content in a collaborative environment, and more particularly, but not exclusively, to valuating users and user responses in a collaborative environment in order to identify the most valuable users and the most valuable user responses. The principles described herein may be embodied in many different forms.

The system may allow an organization to accurately identify the most valuable ideas submitted in a collaborative environment by differentiating valuable ideas from popular ideas. The system utilizes an algorithm which incorporates the total number of unique viewers of an idea and the net rating of the idea to differentiate the valuable ideas from popular ideas. For example, the first ideas submitted to the system may have a high popularity rating by virtue of being first, the so-called "first movers" advantage. The system allows an organization to differentiate between the ideas that are popular, such as these ideas which were submitted first, from ideas that are valuable. The system also implements dynamic thresholds to ensure the ideas are thoroughly evaluated before being identified as valuable.

The system may also allow an organization to identify the most valuable users in a collaborative environment. The organization may provide incentives to the most valuable users so as to encourage them to continue contributing to the collaborative environment. The system may utilize an algorithm which incorporates both the quality and quantity of the users' contributions to determine which users are the most valuable in the collaborative environment. The quality of the user's contributions may be weighted more than the quantity so as to identify users who submit many ideas, but few valuable ideas. The system may further incorporate dynamic thresholds to ensure that only users who have been thoroughly involved in the collaborative environment are identified as valuable.

The system may be used in a collaborative environment to increase the accuracy of the collaborative results. For example, in a collaborative environment users may be presented with an initial item, such as a question, for review. A user may provide a response to the initial item and may rate the responses of other users. The ratings of the users may be used to determine which response is the most accurate response to the initial item. The system may increase the accuracy determining the most accurate response by weighting the ratings of each user. The weight may be indicative of the user's proficiency in the collaborative environment. The weight for each user may be based on the user's activity in the collaborative environment and the ratings the user's responses have received from the other users in the collaborative environment. Thus, when determining the most accurate response the weight applied to the ratings of an expert user may be higher than the weight applied to the ratings of a novice user. By applying more weight to the ratings of the expert users and less weight to the rating of the novice users, the system may increase the accuracy of the collaborative results.

FIG. 1 provides a general overview of a system for valuating users and user generated content in a collaborative environment 100. Not all of the depicted components may be required, however, and some implementations may include additional components. Variations in the arrangement and type of the components may be made without departing from the spirit or scope of the claims as set forth herein. Additional, different or fewer components may be provided.

The system 100 may include one or more content providers 110A-N, such as any providers of content for review, a service provider 130, such as a provider of a collaborative environment, and one or more users 120A-N, such as any users in a collaborative environment. For example, in an organization the content providers 110A-N may be upper management, or decision makers within the organization while the users 120A-N may be employees of the organization. In another example, the content providers 110A-N may be administrators of an online collaborative web site, such as WIKIPEDIA, and the users 120A-N may be any web surfers providing knowledge to the collaborative website. Alternatively or in addition the users 120A-N may be the content providers 110A-N and vice-versa.

The initial item may be any content capable of being responded to by the users 120A-N, such as a statement, a question, a news article, an image, an audio clip, a video clip, or generally any content. In the example of an organization, a content provider A 110A may provide a question as the initial item, such as a question whose answer is of importance to the upper management of the organization.

The users 120A-N may provide responses to the initial item, such as comments, or generally any information that may assist the collaborative process. The users 120A-N may also provide ratings of the responses of the other users 120A-N. The ratings may be indicative of whether the users 120A-N believe the response is accurate for the initial item. For example, if the initial item is a question the users 120A-N may rate the responses based on which response they believe is the most accurate response to the question.

In one example the ratings provided by the users 120A-N for a response may be either an indicator that the users 120A-N like, or agree with, the response, such as a positive rating or "thumbs up" indicator, or an indicator that the users 120A-N dislike, or disagree with, the response, such as a negative rating or "thumbs down" indicator. The service provider 130 may use the ratings provided by the users 120A-N for a response, and the number of users 120A-N who have viewed the response, to generate a response quality score for the response. For example, the response quality score of a response may be determined by subtracting the number of negative ratings from the number of positive ratings received for a response and dividing the result by the number of unique users 120A-N who viewed the response. Alternatively, the result may be divided by the number of unique users 120A-N who rated the response.

The service provider 130 may order the responses based on the response quality scores, and may provide the ordered responses to the content provider A 110A who provided the initial item. The service provider 130 may only provide responses to the content provider A 110A if the responses have been viewed by enough of the users 120A-N for the response quality scores to be deemed substantial. The service provider 130 may identify a view threshold, and may only provide response quality scores for responses which satisfy the view threshold. For example, the service provider 130 may only provide response quality scores for the responses which are in the upper two-thirds of the responses in terms of total views by the users 120A-N. In this example, if there are three responses, two which were viewed by ten users 120A-N, and one which was only viewed by eight users 120A-N, the service provider 130 may only generate a response quality score for the responses which were viewed by ten users 120A-N. By omitting response quality scores for responses with a small number of views, the service provider 130 can control for sampling error which may be associated with a relatively small sample set. The steps of determining response quality scores are discussed in more detail in FIG. 4 below.

The service provider 130 may provide the content provider A 110A with a list of responses which satisfy the view threshold, ordered based on the response quality scores. The list of responses may be provided to the content provider A 110A in a graphical representation, such as the list of responses illustrated in FIG. 10 below. The graphical representation may assist the content provider A 110A in quickly reviewing the responses with the highest response quality scores and selecting the response which the content provider A 110A believes is the most accurate. The content provider A 110A may provide an indication of their selection of the most accurate response to the service provider 130.

The service provider 130 may maintain a user response quality score for each of the users 120A-N in the collaborative environment. The user response quality score may be indicative of the level of proficiency of the users 120A-N in the collaborative environment. The user response quality score of a user A 120A may be based on the response quality scores of the responses provided by the user A 120A. For example, the user response quality score of a user A 120A may be the average of the response quality scores of the responses provided by the user A 120A. The service provider 130 may only determine user response quality scores of a user A 120A if the number of responses provided by the user A 120A meets a contribution threshold. For example, the service provider 130 may only determine the user response quality score for the users 120A-N who are in the upper two-thirds of the users 120A-N in terms of total responses contributed to the collaborative environment. In this example, if a user A 120A contributed ten responses, a user B 120B contributed ten responses, and a user N 120N contributed eight responses, then the service provider 130 may only determine a user response quality score of the user A 120A and the user B 120B. By excluding the users 120A-N with low numbers of contributions, the service provider 130 can control sampling error which may be associated with a relatively small number of contributions. The steps of determining user response quality scores of the users 120A-N in this manner are discussed in more detail in FIG. 5 below.

Alternatively or in addition, the user response quality score for the user A 120A may be based on the number of responses the user A 120A has contributed to the collaborative environment, the number of times the responses of the user A 120A have been viewed by the other users 120B-N, the average rating the users 120B-N have given the responses of the user A 120A, and the number of responses of the user A 120A has been selected as the most accurate response by one of the content providers 110A-N. The user response quality score may be normalized across all of the users 120A-N. For example, if the user response quality score is based on the number of responses provided by the user A 120A, the service provider 130 may divide the number of responses provided by the user A 120A by the average number of responses provided by each of the users 120A-N to determine the user response quality score of the user A 120A. The steps of determining the user response quality scores of the users 120A-N in this manner are discussed in more detail in FIGS. 7 and 8 below.

The service provider 130 may use the user response quality score as a weight in determining the total ratings of the responses by multiplying the user response quality score by each rating provided by the user A 120A. If the service provider 130 requests the users 120A-N to rate whether they "like" or "don't like" a response, a "like" rating may correlate to a value of 1 and a "don't like" rating may correlate to a value of 0. The rating given by each of the users 120A-N may be multiplied by the normalized user response quality score of each of the users 120A-N to determine the weighted rating of each user. The weighted rating of each of the users 120A-N for a given response may then be added together to generate a total rating for the response. By multiplying the ratings of the users 120A-N by a normalized weight, the ratings of the more proficient users 120A-N may be granted a greater affect than those of the less proficient users 120A-N. The steps of weighting responses based on user response quality scores are discussed in more detail in FIG. 9 below.

The service provider 130 may also determine a user value for each of the users 120A-N in the collaborative environment. The user value of a user A 120A may be indicative of the overall value of the user A 120A to the collaborative environment. The user value of the user A 120A may incorporate the number of responses provided by the user A 120A relative to the other users 120B-N, the number of ratings provided by the user A 120A relative to the other users 120B-N, and the user response quality score of the user A 120A. The content providers 110A-N may use the user value of the users 120A-N to identify and reward the users who are the most valuable to the collaborative environment. The steps of determining the user value of the users 120A-N are discussed in more detail in FIG. 6 below.

The content providers 110A-N may provide incentives, such as rewards, to the users 120A-N, such as the user A 120A, if the user response quality score of the user A 120A, or the user value of the user A 120A, is above a certain threshold. The rewards may motivate the users 120A-N to participate in the collaborative environment and provide accurate responses to the collaborative environment. Alternatively or in addition, the content providers 110A-N may eliminate a user A 120A from the collaborative environment if the user response quality score of the user A 120A, or the user value of the user A 120A, falls below a certain threshold. In the example of an organization, being eliminated from the collaborative environment may be detrimental to the employment of a user A 120A, so the user A 120A may also be motivated to not fall below the threshold. By properly incentivizing the users 120A-N, the content providers 110A-N may increase the accuracy of the collaborative review.

In operation one of the content providers 110A-N, such as the content provider A 110A may provide an item for review. The item may be a question whose answer is of value to the content provider A 110A. The content provider A 110A may identify a period of time that the question should be provided to the users 120A-N for review. The content provider A 110A may also identify a set of the users 120A-N that the question should be provided to. The content provider A 110A may use the user response quality score of the users 120A-N, or the user value of the users 120A-N, as a threshold for users 120A-N to be included in the review. For example, the content provider A 110A may specify that only the users 120A-N with user response quality scores in the top ten percent, or a user value in the top ten percent, should be provided the item for review. The content provider A 110A may also select a set of the users 120A-N based on the demographics of the users 120A-N, or generally any characteristic of the users 120A-N capable of segmenting the users 120A-N. The users 120A-N may be required to provide demographic information when they first register to participate in the collaborative environment. In the case of an organization, the human resources department of the organization may provide the demographic information of the users 120A-N.

The service provider 130 may provide the item to the users 120A-N for review. The users 120A-N may be notified that the item is available, such as via an email notification. The users 120A-N may provide one or more responses to the item. In the case of an initial item which is a question, the users 120A-N may provide one or more answers to the question. The service provider 130 may receive the responses from the users 120A-N, and may provide the responses to the other users 120A-N. The users 120A-N may rate the responses.

Once the review period indicated by the content provider A 110A has expired, the service provider 130 may stop providing the item to the users 120A-N. The service provider 130 may then calculate a response quality score of each response provided by the users 120A-N. As mentioned above, the response quality score may be determined by subtracting the number of negative ratings received for the response by the number of positive ratings received for the response and dividing the result by the total number of unique users 120A-N who viewed the response. A response may only be eligible for receiving a response quality score if the response satisfies the view threshold. Alternatively, the service provider 130 may calculate a total rating for each response received from the users 120A-N. The total rating for a response may be a sum of each of the weighted ratings the response received from the users 120A-N. A weighted rating may be equal to the value of the rating received from a user A 120A multiplied by the user response quality score of the user A 120A.

The service provider 130 may order the responses based on the response quality score or total rating of each response. The service provider 130 may provide the ordered list of responses to the content provider A 110A who provided the initial item. The ordered list of responses may allow the content provider A 110A to quickly and efficiently determine the most accurate response. The content provider A 110A may select one or more responses as the most accurate response or responses. The content provider A 110A may provide an indication of the selection of the most accurate response or responses to the service provider 130.

At set intervals of time, such every three months, the service provider 130 may determine which of the users 120A-N achieved a user response quality score, or user value, above an incentive threshold. The users 120A-N with a user response quality score, or user value, above the threshold may be offered a reward. Alternatively or in addition the service provider 130 may award the users 120A-N immediately when their user response quality score, or user value, reaches the incentive threshold.

The service provider 130 may provide one or more reports to the content providers 110A-N and/or the users 120A-N indicating the activity of the users 120A-N and/or the content providers 110A-N, such as displaying the user response quality scores of the users 120A-N. The reports may also provide information about the items reviewed in the collaborative environment and the selected response for each initial item.

One or more of the users 120A-N and/or one or more of the content providers 110A-N may be an administrator of the collaborative environment. An administrator may be generally responsible for maintaining the collaborative environment and may be responsible for maintaining the permissions of the users 120A-N and the content providers 110A-N. The administrator may need to approve of any new users 120A-N added to the collaborative environment before the users 120A-N are allowed to provide responses and ratings to the collaborative environment.

Figure 2:
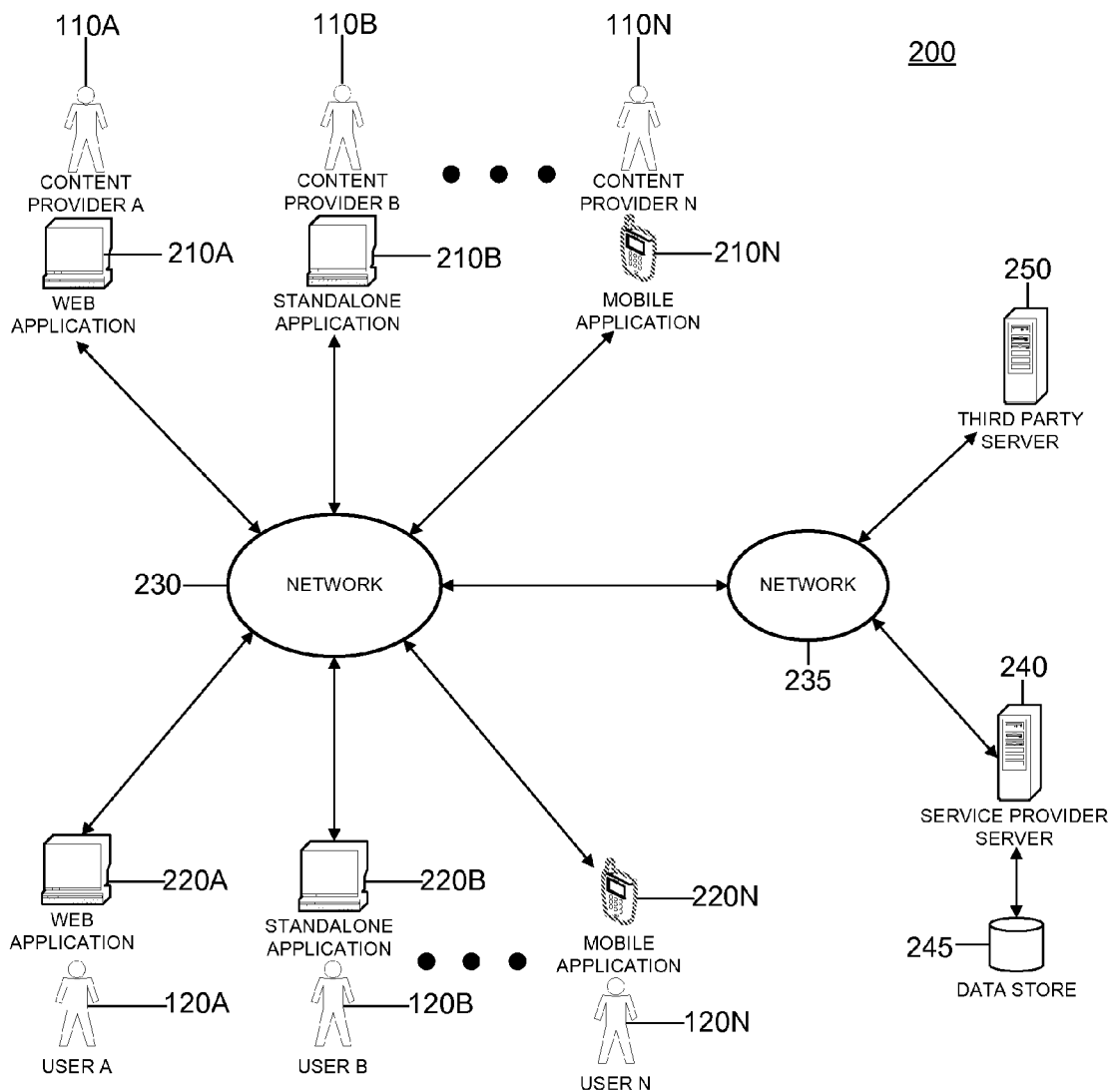
FIG. 2 is a block diagram of a network environment implementing the system of FIG. 1 or other systems for valuating users and user generated content in a collaborative environment.

FIG. 2 provides a view of a network environment 200 implementing the system of FIG. 1 or other systems for valuating users and user generated content in a collaborative environment. Not all of the depicted components may be required, however, and some implementations may include additional components not shown in the figure. Variations in the arrangement and type of the components may be made without departing from the spirit or scope of the claims as set forth herein. Additional, different or fewer components may be provided.

The network environment 200 may include one or more web applications, standalone applications and mobile applications 210A-N, which may be client applications of the content providers 110A-N. The network environment 200 may also include one or more web applications, standalone applications, mobile applications 220A-N, which may be client applications of the users 120A-N. The web applications, standalone applications and mobile applications 210A-N, 220A-N, may collectively be referred to as client applications 210A-N, 220A-N. The network environment 200 may also include a network 230, a network 235, the service provider server 240, a data store 245, and a third party server 250. Some or all of the service provider server 240 and third-party server 250 may be in communication with each other by way of network 235. The third-party server 250 and service provider server 240 may each represent multiple linked computing devices. Multiple distinct third party servers, such as the third-party server 250, may be included in the network environment 200. A portion or all of the third-party server 250 may be a part of the service provider server 240.

The data store 245 may be operative to store data, such as user information, initial items, responses from the users 120A-N, ratings by the users 120A-N, response quality scores, user response quality scores, user values, or generally any data that may need to be stored in a data store 245. The data store 245 may include one or more relational databases or other data stores that may be managed using various known database management techniques, such as SQL and object-based techniques. Alternatively or in addition the data store 245 may be implemented using one or more of the magnetic, optical, solid state or tape drives. The data store 245 may be in direct communication with the service provider server 240. Alternatively or in addition the data store 245 may be in communication with the service provider server 240 through the network 235.

The networks 230, 235 may include wide area networks (WAN), such as the internet, local area networks (LAN), campus area networks, metropolitan area networks, or any other networks that may allow for data communication. The network 230 may include the Internet and may include all or part of network 235; network 235 may include all or part of network 230. The networks 230, 235 may be divided into sub-networks. The sub-networks may allow access to all of the other components connected to the networks 230, 235 in the system 200, or the sub-networks may restrict access between the components connected to the networks 230, 235. The network 235 may be regarded as a public or private network connection and may include, for example, a virtual private network or an encryption or other security mechanism employed over the public Internet.

The content providers 110A-N may use a web application 210A, standalone application 210B, or a mobile application 210N, or any combination thereof, to communicate to the service provider server 240, such as via the networks 230, 235. Similarly, the users 120A-N may use a web application 220A, a standalone application 220B, or a mobile application 220N to communicate to the service provider server 240, via the networks 230, 235.

The service provider server 240 may provide user interfaces to the content providers 110A-N via the networks 230, 235. The user interfaces of the content providers 110A-N may be accessible through the web applications, standalone applications or mobile applications 210A-N. The service provider server 240 may also provide user interfaces to the users 120A-N via the networks 230, 235. The user interfaces of the users 120A-N may also be accessible through the web applications, standalone applications or mobile applications 220A-N. The user interfaces may be designed using ADOBE FLEX. The user interfaces may be initially downloaded when the applications 210A-N, 220A-N first communicate with the service provider server 240. The client applications 210A-N, 220A-N may download all of the code necessary to implement the user interfaces, but none of the actual data. The data may be downloaded from the service provider server 240 as needed. The user interfaces may be developed using the singleton development pattern, utilizing the model locator found within the cairngorm framework. Within the singleton pattern there may be several data structures each with a corresponding data access object. The data structures may be structured to receive the information from the service provider server 240.

The user interfaces of the content providers 110A-N may be operative to allow a content provider A 110A to provide an initial item, and allow the content provider A 110A to specify a period of time for review of the item. The user interfaces of the users 120A-N may be operative to display the initial item to the users 120A-N, allow the users 120A-N to provide responses and ratings, and display the responses and ratings to the other users 120A-N. The user interfaces of the content providers 110A-N may be further operative to display the ordered list of responses to the content provider A 110A and allow the content provider to provide an indication of the selected response.

The web applications, standalone applications and mobile applications 210A-N, 220A-N may be connected to the network 230 in any configuration that supports data transfer. This may include a data connection to the network 230 that may be wired or wireless. The web applications 210A, 220A may run on any platform that supports web content, such as a web browser or a computer, a mobile phone, personal digital assistant (PDA), pager, network-enabled television, digital video recorder, such as TIVO®, automobile and/or any appliance capable of data communications.

The standalone applications 210B, 220B may run on a machine that may have a processor, memory, a display, a user interface and a communication interface. The processor may be operatively connected to the memory, display and the interfaces and may perform tasks at the request of the standalone applications 210B, 220B or the underlying operating system. The memory may be capable of storing data. The display may be operatively connected to the memory and the processor and may be capable of displaying information to the content provider B 110B or the user B 120B. The user interface may be operatively connected to the memory, the processor, and the display and may be capable of interacting with a user B 120B or a content provider B 110B. The communication interface may be operatively connected to the memory, and the processor, and may be capable of communicating through the networks 230, 235 with the service provider server 240, and the third party server 250. The standalone applications 210B, 220B may be programmed in any programming language that supports communication protocols. These languages may include: SUN JAVA %, C++, C#, ASP, SUN JAVASCRIPT®, asynchronous SUN JAVASCRIPT®, or ADOBE FLASH ACTIONSCRIPT®, ADOBE FLEX, and PHP, amongst others.

The mobile applications 210N, 220N may run on any mobile device that may have a data connection. The data connection may be a cellular connection, a wireless data connection, an internet connection, an infra-red connection, a Bluetooth connection, or any other connection capable of transmitting data.

The service provider server 240 may include one or more of the following: an application server, a data store, such as the data store 245, a database server, and a middleware server. The application server may be a dynamic HTML server, such as using ASP, JSP, PHP, or other technologies. The service provider server 240 may co-exist on one machine or may be running in a distributed configuration on one or more machines. The service provider server 240 may collectively be referred to as the server. The service provider server 240 may implement a server side wiki engine, such as ATLASSIAN CONFLUENCE. The service provider server 240 may receive requests from the users 120A-N and the content providers 110A-N and may provide data to the users 120A-N and the content providers 110A-N based on their requests. The service provider server 240 may communicate with the client applications 210A-N, 220A-N using extensible markup language (XML) messages.

The third party server 250 may include one or more of the following: an application server, a data source, such as a database server, and a middleware server. The third party server may implement any third party application that may be used in a system for valuating users and user generated content in a collaborative environment, such as a user verification system. The third party server 250 may co-exist on one machine or may be running in a distributed configuration on one or more machines. The third party server 250 may receive requests from the users 120A-N and the content providers 110A-N and may provide data to the users 120A-N and the content providers 110A-N based on their requests.

Figure 11:
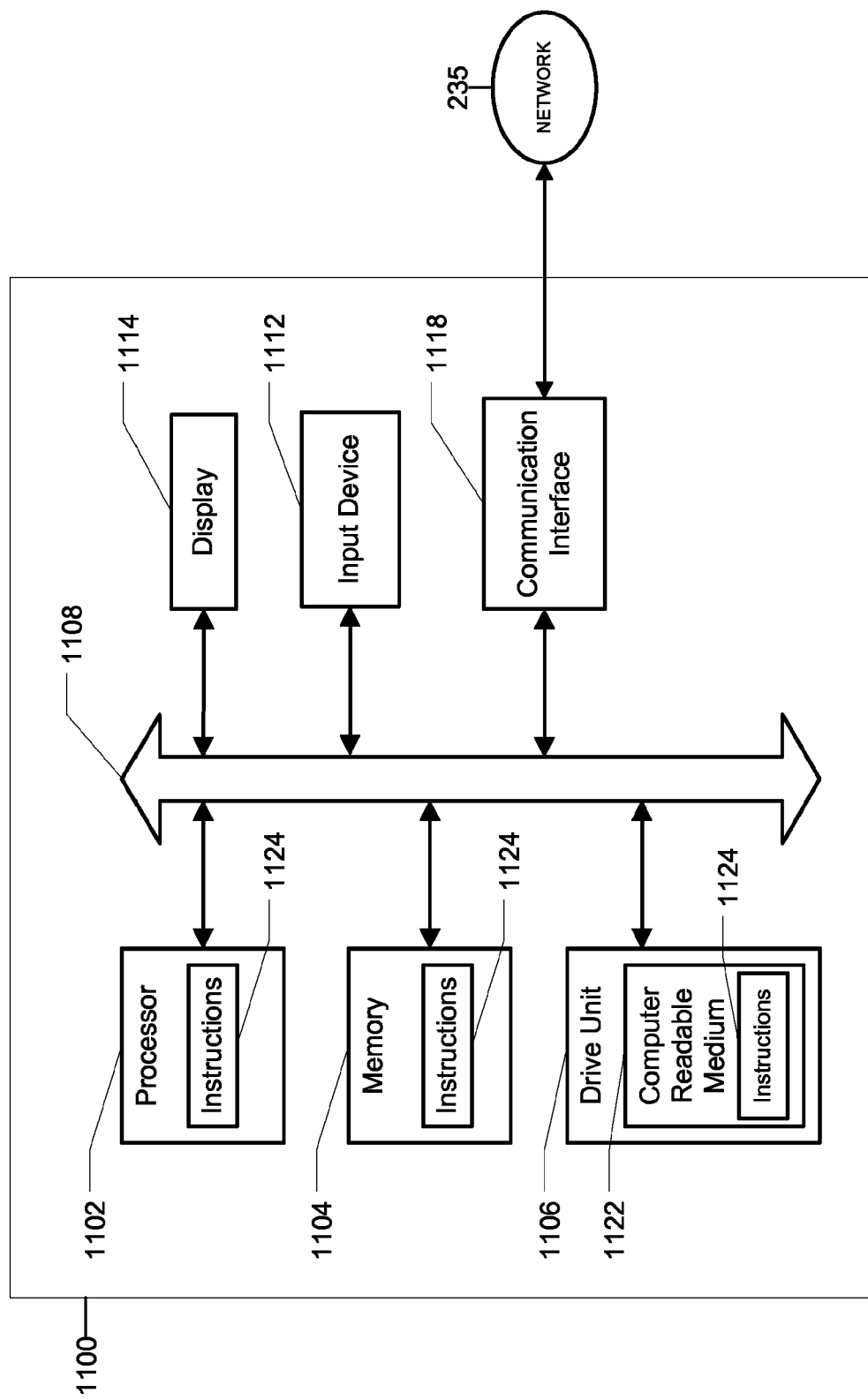
FIG. 11 is an illustration of a general computer system that may be used in the systems of FIG. 2 or FIG. 3, or other systems for valuating users and user generated content in a collaborative environment.

The service provider server 240 and the third party server 250 may be one or more computing devices of various kinds, such as the computing device in FIG. 11. Such computing devices may generally include any device that may be configured to perform computation and that may be capable of sending and receiving data communications by way of one or more wired and/or wireless communication interfaces. Such devices may be configured to communicate in accordance with any of a variety of network protocols, including but not limited to protocols within the Transmission Control Protocol/Internet Protocol (TCP/IP) protocol suite. For example, the web applications 210A, 210A may employ HTTP to request information, such as a web page, from a web server, which may be a process executing on the service provider server 240 or the third-party server 250.

There may be several configurations of database servers, such as the data store 245, application servers, and middleware servers included in the service provider server 240, or the third party server 250. Database servers may include MICROSOFT SQL SERVER®, ORACLE®, IBM DB2® or any other database software, relational or otherwise. The application server may be APACHE TOMCAT®, MICROSOFT IIS®, ADOBE COLDFUSION®, or any other application server that supports communication protocols. The middleware server may be any middleware that connects software components or applications.

The networks 230, 235 may be configured to couple one computing device to another computing device to enable communication of data between the devices. The networks 230, 235 may generally be enabled to employ any form of machine-readable media for communicating information from one device to another. Each of networks 230, 235 may include one or more of a wireless network, a wired network, a local area network (LAN), a wide area network (WAN), a direct connection such as through a Universal Serial Bus (USB) port, and the like, and may include the set of interconnected networks that make up the Internet. The networks 230, 235 may include any communication method by which information may travel between computing devices.

In operation the client applications 210A-N, 220A-N may make requests back to the service provider server 240. The service provider server 240 may access the data store 245 and retrieve information in accordance with the request. The information may be formatted as XML and communicated to the client applications 210A-N, 220A-N. The client applications 210A-N, 220A-N may display the XML appropriately to the users 120A-N, and/or the content providers 110A-N.

Figure 3:
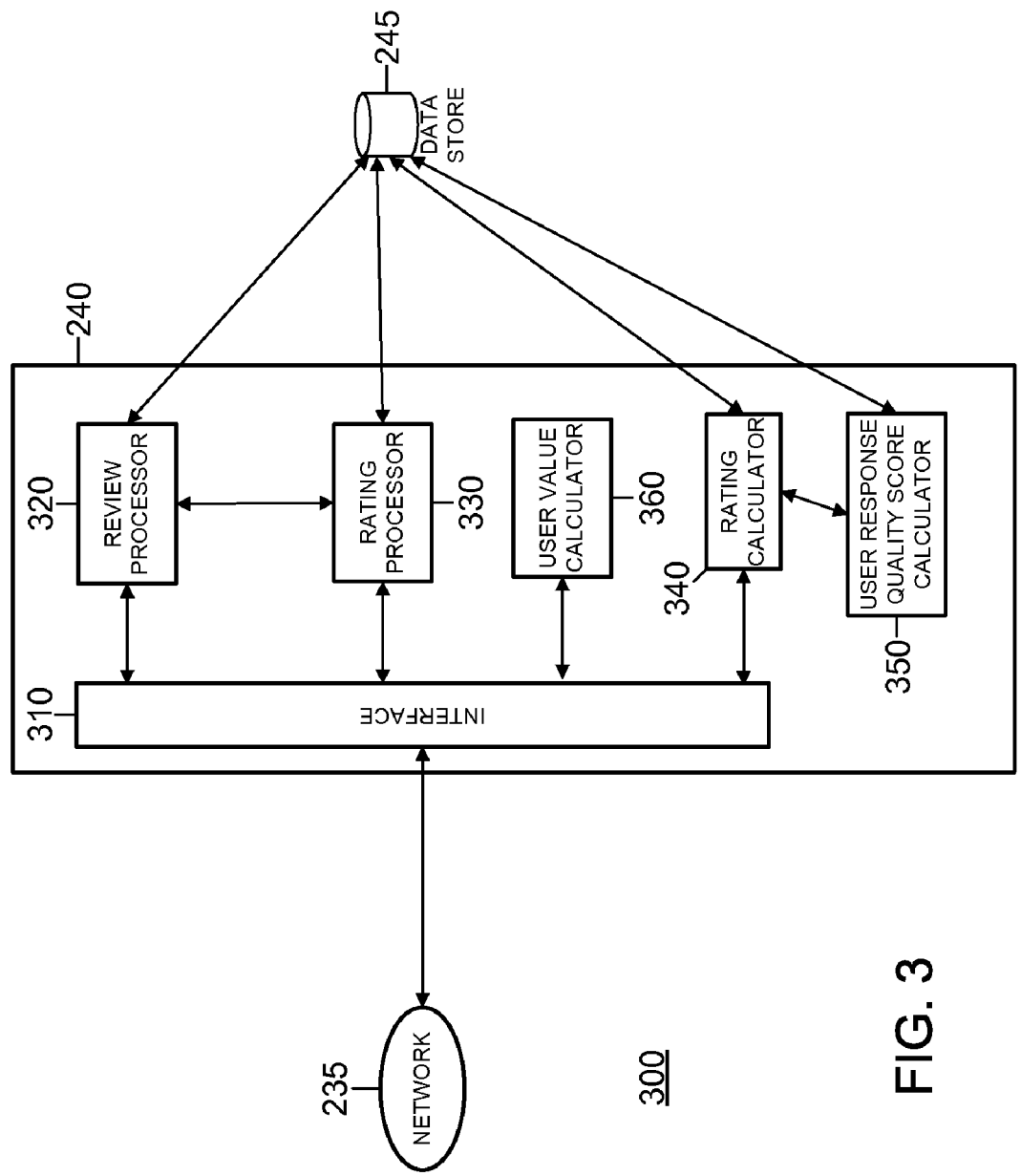
FIG. 3 is a block diagram of the server-side components in the system of FIG. 2 or other systems for valuating users and user generated content in a collaborative environment.

FIG. 3 provides a view of the server-side components in a network environment 300 implementing the system of FIG. 2 or other systems for valuating users and user generated content in a collaborative environment. Not all of the depicted components may be required, however, and some implementations may include additional components not shown in the figure. Variations in the arrangement and type of the components may be made without departing from the spirit or scope of the claims as set forth herein. Additional, different or fewer components may be provided.

The network environment 300 may include the network 235, the service provider server 240, and the data store 245. The server provider server 240 may include an interface 310, a response processor 320, a rating processor 330, rating calculator 340, a user quality score calculator 350, and a user value calculator 360. The interface 310, response processor 320, rating processor 330, rating calculator 340, the user quality score calculator 350, and the user value calculator 360 may be processes running on the service provider server 240, may be hardware components of the service provider server 240, such as dedicated processors or dedicated processing cores, or may be separate computing devices, such as the one described in FIG. 11.

The interface 310 may communicate with the users 120A-N and the content providers 110A-N via the networks 230, 235. The response processor 320 may process responses and initial items from the users 120A-N and the content providers 110A-N, the rating processor 330 may process ratings received from the users 120A-N, views of responses of the users 120A-N, and selections of the content provider A 110A, the rating calculator 340 may calculate the response quality score, weighted ratings and total ratings of the responses, the user response quality score calculator 350 may calculate the user response quality scores of the users 120A-N, and the user value calculator may determine the user values of the users 120A-N.

In operation the interface 310 may receive data from the content providers 110A-N or the users 120A-N via the network 235. For example, one of the content providers 110A-N, such as the content provider A 110A, may provide an initial item, and one of the users 120A-N, such as the user A 120A may provide a response or a rating of a response. In the case of an initial item received from the content provider A 110A, the interface 310 may communicate the initial item to the response processor 320. The response processor 320 may store the initial item in the data store 245. The response processor 320 may store data describing the content provider A 110A who provided the initial item and the date/time the initial item was provided. The response processor 320 may also store the review period identified by the content provider A 110A for the item.

In the case of a response received from the user A 120A, the interface 310 may communicate the response to the response processor 320. The response processor 320 may store the response in the data store 245 along with the initial item the response was based on. The response processor 320 may store user data describing the user A 120A who provided the response and the date/time the response was provided. In the case of a rating received from the user A 120A, the interface 310 may communicate the rating to the rating processor 330. The rating processor 330 may store the rating in the data store 245 along with the response the rating was given for. The rating processor 330 may also store user data describing the user A 120A who provided the rating, user data describing the user B 120B who provided the response that was rated, and the date/time the response was rated.

The rating processor 330 may also store data when one of the users 120A-N views a response of the user A 120A. The interface 310 may receive an indication that a response of the user A 120A was viewed by the user B 120B and may communicate the indication to the rating processor 330. The rating processor 330 may store user data describing the user A 120A who provided the response, user data describing the user B 120B who viewed the response, the response viewed, and the date/time the response was viewed.

The rating processor 330 may also store the response selected by the content provider A 110A as the most accurate response. The interface 310 may receive an indication of the response selected by the content provider A 110A via the interface 310. The interface 310 may communicate the indication of the selected response to the rating processor 330. The rating processor 330 may store the selected response, user data describing the user A 120A who provided the selected response, user data describing the content provider A 110A, and the date/time the selected response was received by the interface 310.

The rating calculator 340 may determine the response quality score of responses to an initial item, and may order the responses based on their response quality scores. The rating calculator 340 may follow the steps of FIG. 4 to determine the response quality score of a response. Alternatively or in addition, the rating calculator 340 may calculate the weighted ratings and the total ratings of the responses, and may order the responses based on their total ratings. The rating calculator 340 may follow the steps of FIG. 8 to determine the weighted ratings and the total ratings of the responses.

Once the rating calculator 340 has calculated the response quality scores and/or total rating of each response, the rating calculator 340 may order the responses based on the response quality scores and/or ratings and may provide the ordered responses, with the response quality scores and/or total ratings, to the content provider A 110A who provided the initial item.

The service provider server 240 may re-calculate a user response quality score of a user A 120A each time the underlying data the score is based on changes. Alternatively or in addition the rating calculator 340 may request the user response quality scores of the users 120A-N when the rating calculator 340 calculates the total rating of each response at the end of review period.

The user response quality score calculator 350 may receive a request for the user response quality score of the user A 120A. The user response quality score calculator 350 may retrieve one or more values from the data store 245 in order to determine the user response quality score of the user A 120A, such as the ratings of the responses provided by the user A 120A. The user response quality score calculator 350 may follow the steps of FIG. 5, FIG. 7, or FIG. 8 to determine the user response quality score of the user A 120A.

The user value calculator 360 may determine the user values of the users 120A-N at specified intervals, or when requested, such as by one of the content providers 110A-N. The user value calculator 360 may retrieve one or more values from the data store 245 in order to calculate the user value, such as the number of contributions provided by the user A 120A, the number of ratings provided by the user A 120A, and the user response quality score of the user A 120A. The steps of determining the user values of the users 120A-N are discussed in more detail in FIG. 5 below.

Figure 4:
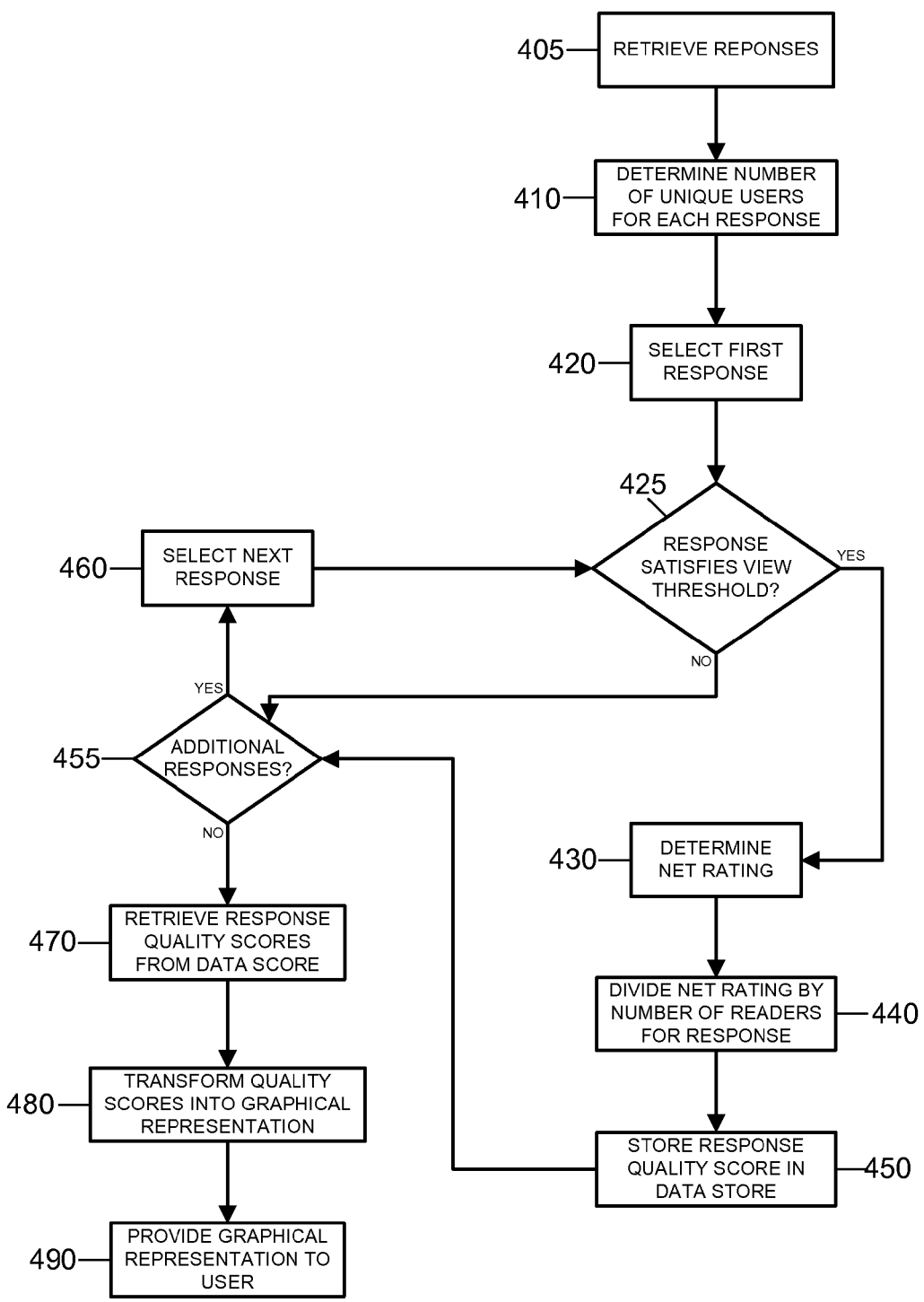
FIG. 4 is a flowchart illustrating the operations of determining response quality scores in the systems of FIG. 1, FIG. 2, or FIG. 3, or other systems for valuating users and user generated content in a collaborative environment.

FIG. 4 is a flowchart illustrating the operations of determining response quality scores in the systems of FIG. 1, FIG. 2, or FIG. 3, or other systems for valuating users and user generated content in a collaborative environment. The steps of FIG. 4 are described as being performed by the service provider server 240. However, the steps may be performed by the operating system of the service provider server 240, a processor of the service provider server 240, a processing core of the service provider server 240, any other hardware component of the service provider server 240, or any combination thereof. Alternatively the steps may be performed by an external hardware component, an external software process, or any combination thereof.

At step 405, the service provider server 240 may retrieve one or more responses received from the users 120A-N, such as from the data store 245. The responses may have been provided by the users 120A-N in response to an initial item provided by one of the content providers 110A-N. At step 410, the service provider server 240 may determine the number of unique users who viewed each response. At step 420, the service provider server 240 may select the first response from the set of retrieved responses. At step 425, the service provider server 240 determines whether the selected response satisfies the view threshold. The view threshold may indicate the minimum number of unique users 120A-N who must view a response in order for the response to be eligible to receive a response quality score. The view threshold may be determined by an administrator, or the view threshold may have a default value, such as only responses in the top two-thirds of responses in terms of total unique views satisfy the view threshold.

If, at step 425, the service provider server 240 determines that the selected response satisfies the view threshold, the service provider server 240 moves to step 430. At step 430, the service provider server 240 determines the net rating of the response. For example, if the users 120A-N rate the responses with a positive rating or a negative rating, the net rating may be the total number of negative ratings the response received subtracted from the total number of positive ratings the response received. Alternatively or in addition the response may be rated on a scale of one to ten. In this example, the service provider server 240 may determine the net rating of the response by determining the sum of all of the ratings.

At step 440, the service provider server 240 may determine the response quality score by dividing the net rating by the total number of unique users 120A-N who viewed the response. At step 450, the service provider server 240 may store the response quality score of the response in the data store 245. The service provider server 245 may also store an association between the response quality score and the response such that the response quality score can be retrieved based on the response. At step 455, the service provider server 240 may determine whether there are any additional responses for the initial item which have yet to be evaluated for satisfying the view threshold. If, at step 455, the service provider server 240 determines that there are additional responses, the service provider server 240 moves to step 460. At step 460, the service provider server 240 may select the next response from the set of responses and repeats steps 425-455 for the next response. If, at step 425, the service provider server 240 determines that the selected response does not satisfy the view threshold, the service provider server 240 may move to step 455 and may determine whether any other responses have not yet been evaluated for satisfying the view threshold.

Figure 10:
FIG. 10 is a screenshot of a reporting screen in the systems of FIG. 1, FIG. 2, or FIG. 3, or other systems for valuating users and user generated content in a collaborative environment.

If, at step 455, the service provider server 240 determines that all of the responses have been evaluated for satisfying the view threshold, the service provider 240 may move to step 470. At step 470, the service provider server 240 may retrieve the response quality scores and associated responses from the data store 245. At step 480, the service provider server 240 may transform the response quality scores and responses into a graphical representation. FIG. 10 may provide an example of a graphical representation of responses and response quality scores. At step 490, the service provider server 240 may provide the graphical representation to the content provider A 110A who provided the initial item the responses relate to, such as through a device of the user. For example, the service provider server 240 may provide the graphical representation to a content provider A 110A, or to an administrator.

Figure 5:
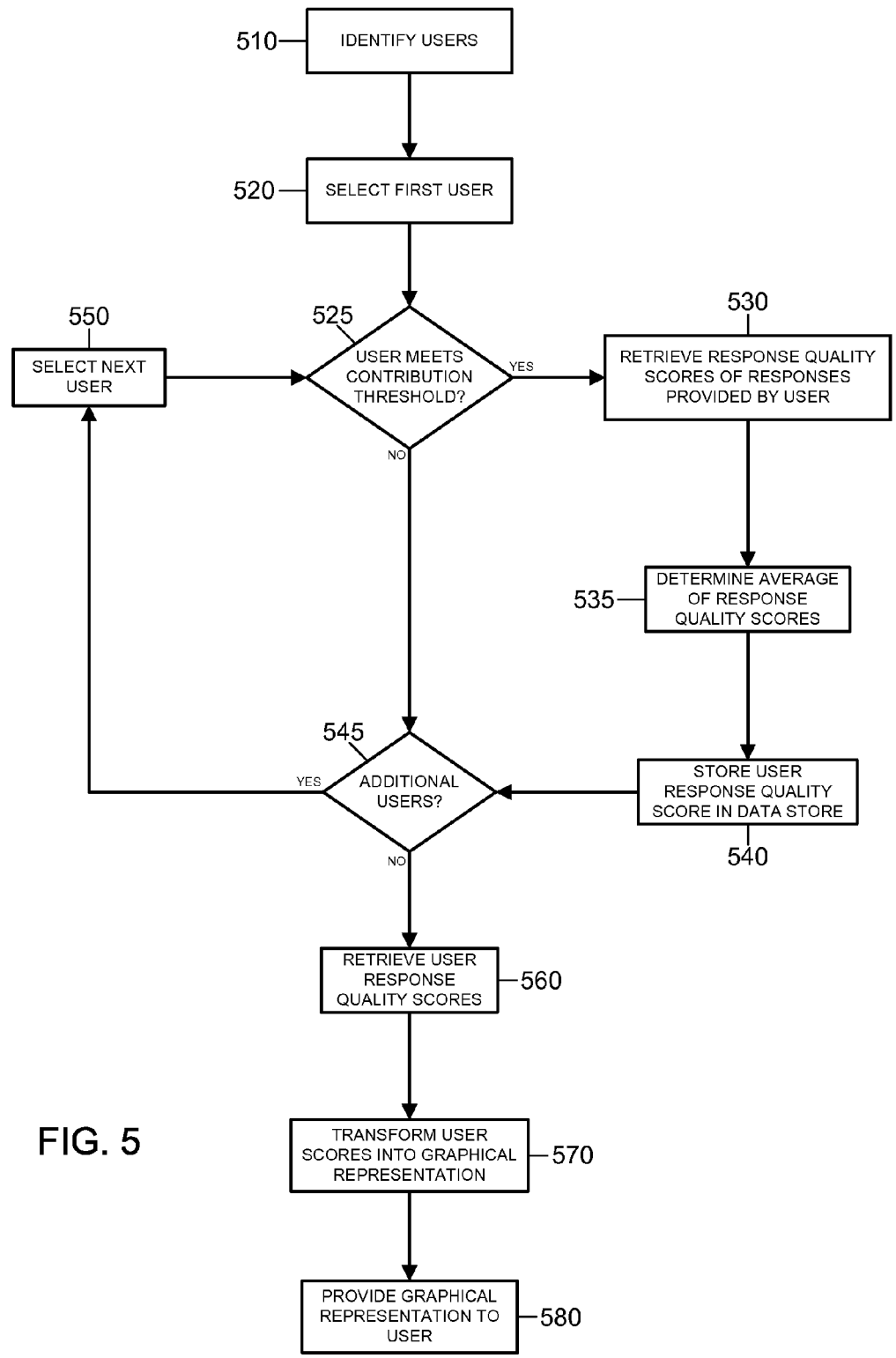
FIG. 5 is a flowchart illustrating the operations of determining a user response quality score in the systems of FIG. 1, FIG. 2, or FIG. 3, or other systems for valuating users and user generated content in a collaborative environment.

FIG. 5 is a flowchart illustrating the operations of determining a user response quality score in the systems of FIG. 1, FIG. 2, or FIG. 3, or other systems for valuating users and user generated content in a collaborative environment. The steps of FIG. 5 are described as being performed by the service provider server 240. However, the steps may be performed by the operating system of the service provider server 240, a processor of the service provider server 240, a processing core of the service provider server 240, any other hardware component of the service provider server 240, or any combination thereof. Alternatively the steps may be performed by an external hardware component, an external software process, or any combination thereof.

At step 510, the service provider server 240 identifies the set of users 120A-N of the collaborative environment. For example, the service provider server 240 may retrieve user data describing the users 120A-N from the data store 245. At step 520, the service provider server 240 may select the first user from the set of users 120A-N of the collaborative environment. At step 525, the service provider server 240 may determine whether the selected user satisfies the contribution threshold. The contribution threshold may indicate the minimum number of responses a user A 120A should contribute to the collaborative environment before the user A 120A is eligible to receive a user response quality score. The contribution threshold may be determined by an administrator or may have a default value. For example, a default contribution threshold may indicate that only the users 120A-N in the top two-thirds of the users 120A-N in terms of contributions to the collaborative environment satisfy the contribution threshold.

If, at step 525, the service provider server 240 determines that the selected user satisfies the contribution threshold, the service provider server 240 moves to step 530. At step 530, the service provider server retrieves the response quality scores of all of the responses provided by the selected user. At step 535, the service provider server 240 determines the user response quality score of the selected user by determining the average of the response quality scores of the responses provide by the selected user. At step 540, the service provider server 240 stores the user response quality score of the selected user in the data store 245. The service provider server 240 may also store an association between the user response quality score and the user data such that the user response quality score can be retrieved based on the user data.

At step 545, the service provider server 240 determines whether there are any additional users 120B-N which have yet to be evaluated against the contribution threshold. If, at step 545, the service provider server 240 determines there are additional users, the service provider server 240 moves to step 550. At step 550, the service provider server 240 selects the next user and repeats steps 525-545 for the next user. If, at step 525, the service provider server 240 determines that the selected user does not satisfy the contribution threshold, the service provider server 240 moves to step 545. Once the service provider server 240 have evaluated all of the users 120A-N against the contribution threshold, and determined user response quality scores for eligible users 120A-N, the service provider server 240 moves to step 560.

At step 560, the service provider server 240 retrieves the determined user response quality scores, and the associated user data from the data store 245. At step 570, the service provider server 240 transforms the user response quality scores and the associated user data into a graphical representation. The graphical representation may be similar to the graphical representation illustrated in FIG. 10, but displaying user data and user response quality scores. At step 580, the service provider server 240 provides the graphical representation to a user, such as through a device of the user. For example, the service provider server 240 may provide the graphical representation to one of the content providers 110A-N or to an administrator.

Figure 6:
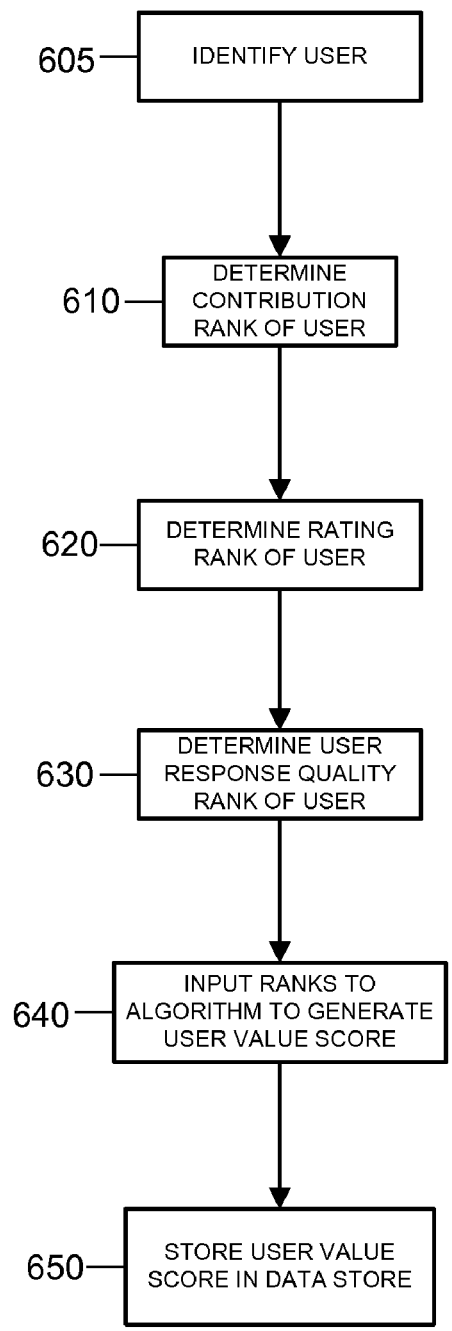
FIG. 6 is a flowchart illustrating the operations of determining the value of a user in the systems of FIG. 1, FIG. 2, or FIG. 3, or other systems for valuating users and user generated content in a collaborative environment.

FIG. 6 is a flowchart illustrating the operations of determining the value of users in the systems of FIG. 1, FIG. 2, or FIG. 3, or other systems for valuating users and user generated content in a collaborative environment. The steps of FIG. 6 are described as being performed by the service provider server 240. However, the steps may be performed by the operating system of the service provider server 240, a processor of the service provider server 240, a processing core of the service provider server 240, any other hardware component of the service provider server 240, or any combination thereof. Alternatively the steps may be performed by an external hardware component, an external software process, or any combination thereof.

At step 605, the service provider server 240 may identify a user A 120A for which to determine a user value. For example, one of the content providers 110A-N, or an administrator, may request the user value of a user A 120A. Alternatively, the service provider server 240 may determine the user values of all of the users 120A-N, such as to generate a report or graphical representation of user values. At step 610, the service provider server 240 may determine the contribution rank of the user A 120A. The contribution rank may identify the number of contributions to the collaborative environment, such as responses, provided by the user A 120A relative to the number of contributions provided by the other users 120B-N. For example, if the user A 120A provided the most responses to the collaborative environment, the user A 120A may have a contribution rank of 1.

At step 620, the service provider server 240 may determine the rating rank of the user A 120A. The rating rank may identify the number of responses which were rated by the user A 120A relative to the number of responses rated by the other users 120B-N. For example, if the user A 120A rated the most responses in the collaborative environment, the user A 120A may have a rating rank of 1. At step 630, the service provider server 240 determines the user response quality rank of the user A 120A. The user response quality rank of the user A 120A may represent the user response quality score of the user A 120A as it compares to the user response quality scores of the other users 120B-N. For example, if the user A 120A received the highest user response quality score out of the users 120A-N, the user A 120A may receive a user response quality rank of 1.

At step 640, the service provider server 240 inputs the contribution rank, rating rank, and user response quality rank of the user A 120A to an algorithm to determine the user value of the user A 120A. The algorithm may apply different weights to each of the ranks. The weights applied to the ranks may vary by implementation, but may generally represent the amount of value an organization wishes to accord to providing response, rating responses and providing quality responses in the collaborative environment. In one example, a weight of 0.25 may be applied to the contribution rank and the rating rank, and a weight of 0.5 may be applied to the user response quality rank. In this example, an organization may wish to weigh the quality of the responses of the users 120A-N more than the number of responses provided or the number of responses rated by the users 120A-N. Thus, in this example the organization may wish to weigh quality over quantity. At step 650, the service provider server 240 stores the user value in the data store 245. The service provider server 240 may store an association between the user data of the user A 120A and the user value such that the user value can be retrieved based on the user data.

Figure 7:
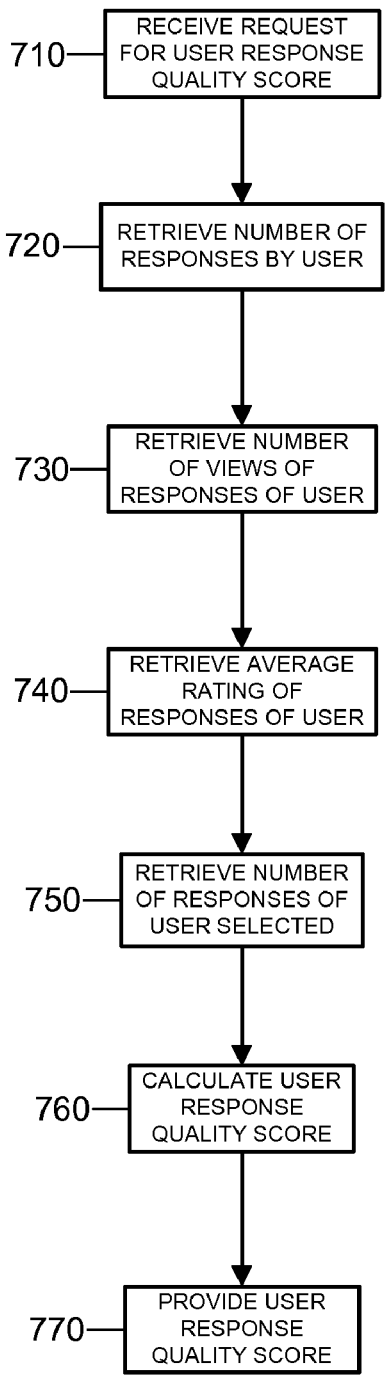
FIG. 7 is a flowchart illustrating alternative operations for determining a user response quality score in the systems of FIG. 1, FIG. 2, or FIG. 3, or other systems for valuating users and user generated content in a collaborative environment.

FIG. 7 is a flowchart illustrating the alternative operations of determining a user response quality score in the systems of FIG. 1, FIG. 2, or FIG. 3, or other systems for valuating users and user generated content in a collaborative environment. The steps of FIG. 7 are described as being performed by the service provider server 240. However, the steps may be performed by the operating system of the service provider server 240, a processor of the service provider server 240, a processing core of the service provider server 240, any other hardware component of the service provider server 240, or any combination thereof. Alternatively the steps may be performed by an external hardware component, an external software process, or any combination thereof.

At step 710, the service provider server 240 may receive a request for a user response quality score, such as from the rating calculator 340. The user response quality score may be requested during the calculation of a weighted score of a user A 120A. At step 720, the service provider server 240 may retrieve, from the data store 245, the number of responses the user A 120A provided to the service provider server 240. At step 730, the service provider server 240 may retrieve, from the data store 245, the number of times the responses of the user A 120A were viewed by other users 120B-N. At step 740, the service provider server 240 may retrieve, from the data store 245, the total rating of each of the responses provided by the user A 120A. The total rating of each of the responses provided by the user A 120A may be used to determine the average total rating of the responses of the user A 120A. At step 750, the service provider server 240 may retrieve, from the data store 245, the number of responses of the user A 120A selected by one of the content providers 110A-N.

At step 760, the service provider server 240 may use the retrieved data to calculate the user response quality score of the user A 120A. For example, the service provider server 240 may determine the normalized value of each of the individual metrics. A normalized value may be determined by calculating the average value of a given metric for all of the users 120A-N, and dividing the value of the user A 120A by the average value of all the users 120A-N. The service provider server 240 may then add the normalized values of the user A 120A to determine a sum of the normalized values. The sum of the normalized values may be the user response quality score of the user A 120A. Alternatively or in addition, the sum of the normalized values may be normalized to obtain the user response quality score. Alternatively or in addition the service provider server 240 may add all of the individual values together and normalize the sum of the individual values. Alternatively or in addition the service provider server 240 may weight one of the values more than the others, such as weighting the average rating of the responses of the user A 120A. Alternatively or in addition the user response quality score may be equal to one of the metrics, such as the number of responses provided by the user A 120A to the service provider server 240.

Alternatively or in addition the service provider server 240 may calculate a normalized value for each metric by determining the maximum value of the metric for all of the users 120A-N, and dividing the value of the user A 120A by the maximum value of all the users 120A-N. For example, the service provider server 240 may use three metrics in determining the user response quality score value: the number of responses the user A 120A provided to the service provider server 240, the number of times the responses of the user A 120A were viewed by the users 120A-N, and the average total rating the responses of the user A 120A received. The user service provider server 240 may determine the maximum number of responses provided by any of the users 120A-N, the maximum number of times responses of any of the users 120A-N were viewed by the other users 120A-N, and the maximum average total rating the responses of any of the users 120A-N received.

The service provider server 240 may calculate the normalized value of each of the metrics by dividing the value of the user A 120A by the maximum value received by the service provider server 240 for the metric. For example the normalized number of responses provided by the user A 120A may be calculated by dividing the number of responses provided by the user A 120A by the maximum number of responses received by any of the users 120A-N. Once the normalized values are determined, the service provider server 240 may multiply the nominal values by a weight. The weight may be indicative of the importance of the metric to the total rating of the response. For example, the service provider server 240 may multiply the normalized number of responses by 0.16, the normalized number of views by 0.33, and the normalized average response total rating by 0.5. After multiplying the normalized values by a weight, the service provider server 240 may add together the results to determine the user response quality score of the user A 120A. At step 770, the service provider server 240 may provide the user response quality score to the requestor, such as the rating calculator 330.

Figure 8:
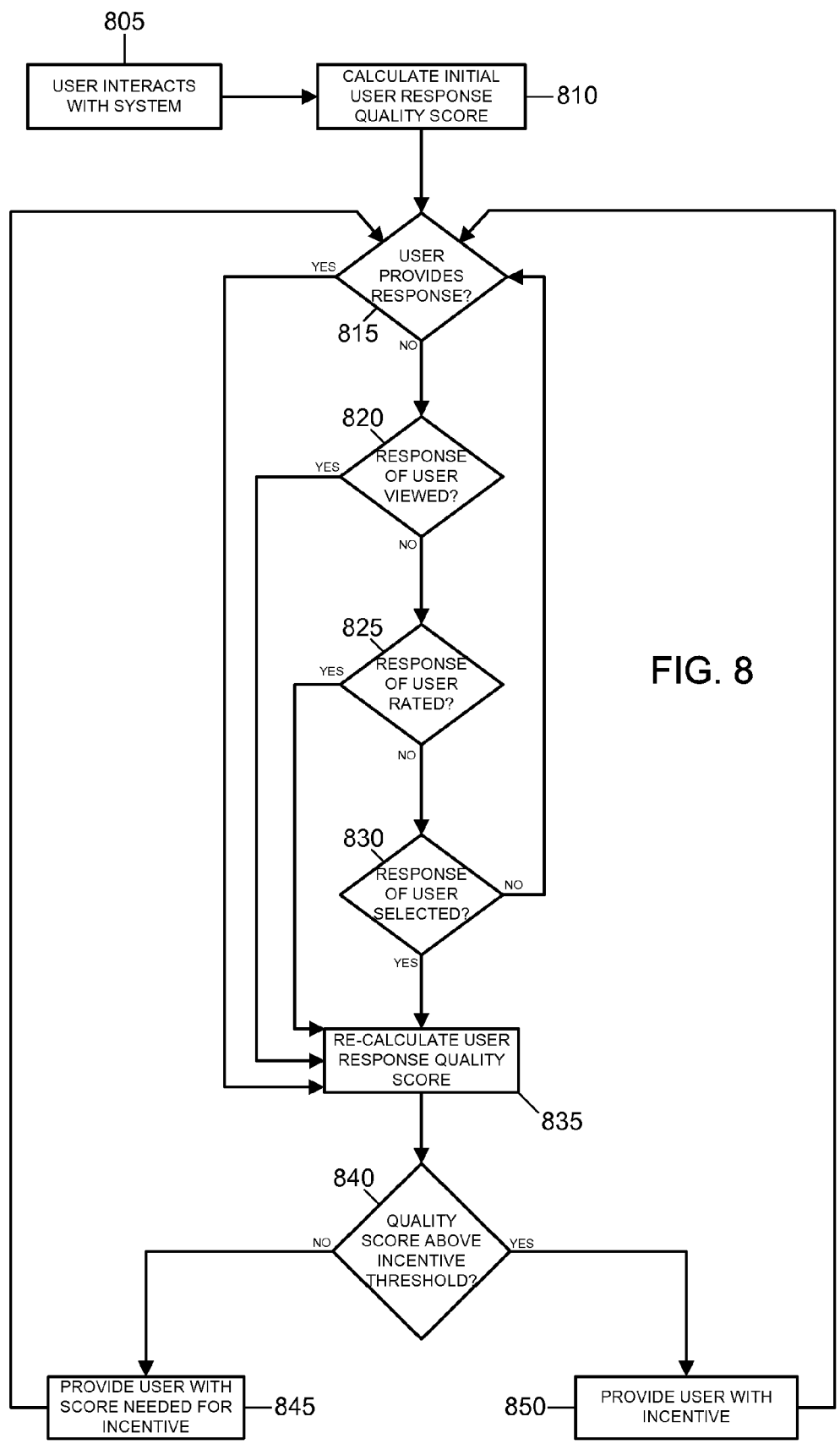
FIG. 8 is a flowchart illustrating alternative operations for determining and maintaining a user response quality score in the systems of FIG. 1, FIG. 2, or FIG. 3, or other systems for valuating users and user generated content in a collaborative environment.

FIG. 8 is a flowchart illustrating alternative operations of determining and maintaining a user response quality score in the systems of FIG. 1, FIG. 2, or FIG. 3, or other systems for valuating users and user generated content in a collaborative environment. The steps of FIG. 8 are described as being performed by the service provider server 240. However, the steps may be performed by the operating system of the service provider server 240, a processor of the service provider server 240, a processing core of the service provider server 240, any other hardware component of the service provider server 240, or any combination thereof. Alternatively the steps may be performed by an external hardware component, an external software process, or any combination thereof.

At step 805, one of the users 120A-N, such as the user A 120A may interact with the service provider server 240 for the first time, such as navigating to web login page of the service provider server 240. The user A 120A may be required to provide information to create an account with the service provider server 240 in order to participate in the collaborative environment. The information may include personal information, such as name, home address, email address, telephone number, or generally any personal information, demographic information, such as age, ethnicity, gender, or generally any information that may be used by the service provider server 240. The user A 120A may be granted immediate access to the service provider server 240, or an administrator of the service provider server 240 may have to approve of the user A 120A before the user A 120A is granted access to the service provider server 240.

At step 810, the service provider server 240 may calculate an initial user response quality score of the user A 120A. The initial user response quality score may be 0, may be a default score, may be a score specified by an administrator with knowledge of the user A 120A, or may be determined based on the information the user A 120A provided to the service provider server 240. At steps 815-830, the service provider server 240 may continually check for updates to the values that the user response quality score may be based on. Alternatively or in addition the user response quality score may only be calculated when a weighted rating of the user A 120A is being determined, or at the end of a review period.

At step 815, the service provider server 240 may determine whether the user A 120A provided a response to the service provider server 240. If the user A 120A did not provide a response to the service provider server 240, the service provider server 240 may move to step 820. At step 820, the service provider server 240 may determine whether a response of the user A 120A was viewed by one of the other users 120B-N. If a response of the user A 120A was not viewed by one of the other users 120B-N, the service provider server 240 may move to step 825. At step 825, the service provider server 240 determines whether a response of the user A 120A was rated by one of the other users 120B-N. If the response of the user A 120A was not rated by one of the other users 120B-N, the service provider server 240 may move to step 830. At step 830, the service provider server 240 determines whether a response of the user A 120A was selected by one of the content providers 110A-N as the most accurate response. If a response of the user A 120A was not selected by one of the content providers 110A-N, the service provider server 240 may return to step 815 and continue to check for updates.

If at steps 815-830 the user A 120A provides a response, or a response of the user A 120A is viewed by one of the other users 120B-N, or a response of the user A 120A is rated by one of the other users 120B-N, or a response of the user A 120A is selected by one of the content providers 110A-N, the service provider server 240 may move to step 835. Alternatively or in addition, if any other values are used to determine the user response quality score, a change to one of those values may cause the service provider server 240 to move to step 835.

At step 835, the service provider server 240 may re-calculate the user response quality score of the user A 120A based on the changes in the relevant values. The operations of calculating the user response quality score are discussed in more detail in FIG. 5 and FIG. 7. At step 840, the service provider server 240 may determine whether the re-calculated user response quality score of the user A 120A is above the incentive threshold. If the user response quality score of the user A 120A is above the incentive threshold, the service provider server 240 may move to step 850. At step 850, the service provider server 240 may provide the user A 120A with the incentive, such as a gift certificate. The service provider server 240 may then return to step 815 and repeat the checking process. If, at step 840, the user response quality score is not above the incentive threshold the service provider server 240 may move to step 845. At step 845, the service provider server 240 may notify the user A 120A that their user response quality score has changed, but is still below the incentive threshold. The service provider server 240 may provide the user A 120A with the number of points their user response quality score must be raised in order to reach the incentive threshold. The service provider server 240 may then move to step 815 and continue to check for updates.

Alternatively or in addition the service provider server 240 may maintain multiple incentive threshold tiers, such as a bronze tier, a silver tier, and a gold tier. The users 120A-N may be rewarded with more valuable incentives when their user response quality score reaches a higher tier. For example, the gold tier may be users 120A-N with a user response quality score in the top ten percent of the users 120A-N, the silver tier may be the top twenty percent and the bronze tier may be the top thirty percent. The gold tier may have the best rewards, while the silver tier may be middle level rewards and the bronze tier may be lower level rewards.

Alternatively or in addition the service provider server 240 may maintain a lower user response quality score threshold. If the user response quality score of a user A 120A falls below the lower user response quality score threshold, the user A 120A may be warned that their user response quality score is too low. Alternatively or in addition if the user response quality score of a user A 120A falls below the lower threshold the user A 120A may be removed from the service provider server 240. Alternatively or in addition, in the case of an organization, if the user response quality score of a user A 120A falls below the lower threshold, the user A 120A may be terminated from the organization.

Alternatively or in addition the service provider server 240 may use the user values to determine whether to reward the users 120A-N. For example, the service provider server 240 may reward the users 120A-N if the user value of the users 120A-N is above the incentive threshold. FIG. 6 above describes the steps of determining the user values of the users 120A-N.

Figure 9:
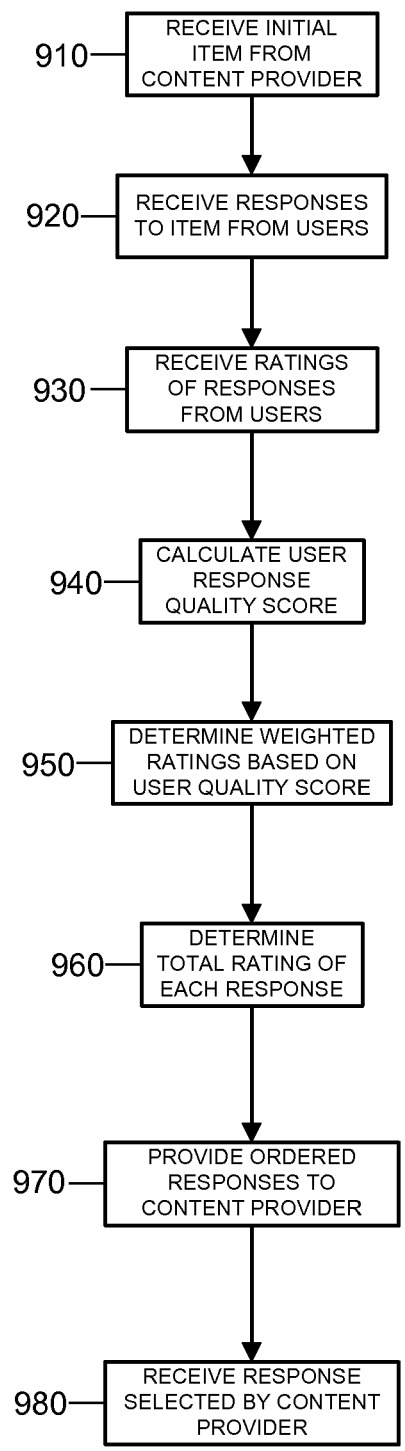
FIG. 9 is a flowchart illustrating the operations of weighting ratings provided by users with user response quality scores in the systems of FIG. 1, FIG. 2, or FIG. 3, or other systems for valuating users and user generated content in a collaborative environment.

FIG. 9 is a flowchart illustrating the operations of weighting user ratings with user response quality scores in the systems of FIG. 1, FIG. 2, or FIG. 3, or other systems for valuating users and user generated content in a collaborative environment. The steps of FIG. 9 are described as being performed by the service provider server 240. However, the steps may be performed by the operating system of the service provider server 240, a processor of the service provider server 240, a processing core of the service provider server 240, any other hardware component of the service provider server 240, or any combination thereof. Alternatively the steps may be performed by an external hardware component, an external software process, or any combination thereof.

At step 910, the service provider server 240 may receive an initial item from the content provider A 110A. The content provider A 110A may provide any item which may be commented on, or responded to, such as a question, an image, an audio clip, a news article, or a video. The content provider A 110A may also provide a period of time that the item should be available for review by the users 120A-N, such as one week. Alternatively or in addition the content provider A 110A may select which of the users 120A-N should be able to review the item. The content provider A 110A may only want a subset of the users 120A-N to review the item, such as the users 120A-N who have the highest user response quality scores.

At step 920, the service provider server 240 may receive responses from the users 120A-N to the initial item. For example, if the initial item is a question the users 120A-N may respond with answers to the question. At step 930, the service provider server 240 may receive ratings of the responses from the users 120-N. For example, the users 120A-N may provide ratings indicating whether they believe a given response is accurate for the initial item.

At step 940, the review period for the initial item may have ended, and the service provider server 240 may calculate the user response quality scores of the users 120A-N who provided ratings. The operations of calculating the user response quality score are discussed in more detail in FIG. 5 and FIG. 7. At step 950, the service provider server 240 may determine the weighted rating of each rating provided by the users 120A-N. For each rating received, the weighted rating may be calculated by multiplying the user response quality score of the user A 120A who provided the rating by the value of the rating. At step 960, the service provider server 240 may determine the total rating of each response based on the weighted ratings of each response. For example the total rating of each response may be calculated by determining the average weighted rating of each response.

At step 970, the service provider server 240 may provide the ordered list of responses to the content provider A 110A. The responses may be ordered based on the total ratings of the responses. At step 980, the service provider server 240 may receive an indication of the response selected by the content provider A 110A as the most accurate response.

FIG. 10 is a screenshot of a reporting screen 1000 in the systems of FIG. 1, FIG. 2, or FIG. 3, or other systems for valuating users and user generated content in a collaborative environment. The reporting screen 1000 may include a report subsection 1010, and an initial item subsection 1020. The report subsection 1010 may include one or more responses 1018, or ideas, and each response 1018 may be associated with a response quality score 1018. The report subsection 1010 may also display the number of positive ratings each response 1018 received, the number of negative ratings each response 1018 received, and the number of users 120A-N who viewed each response 1018.

The initial item subsection 1020 may include an item creation subsection 1024, an item title 1026, and an item description 1022. The item title 1026 may display the title of the initial item for which the responses 1018 were submitted. The item creation subsection 1024 may display one or more data items relating to the creation of the initial item, such as the user A 120A who submitted the item and the date the item was submitted on. The item description subsection 1022 may display a description of the initial item.

In operation, an administrator may view the report subsection 1010 to view the responses 1018 which received the highest response quality scores 1016. The administrator may view the initial item associated with the responses 1018 in the initial idea subsection 1020. The response quality scores 1016 may be transformed into a graphical representation to allow the administrator to quickly identify the highest response quality scores 1016. For example, the response quality scores 1016 may be enclosed in a graphic of a box. The shading of the graphic may correlate to the response quality score 1016 such that higher scores have a lighter shading than lower scores. Alternatively or in addition the graphical representations of the response quality scores 1016 may differ by size, color, shape, or generally any graphical attribute in order to allow an administrator to quickly identify the responses with the highest response quality score.

FIG. 11 illustrates a general computer system 1100, which may represent a service provider server 240, a third party server 250, the client applications 210A-N, 220A-N, or any of the other computing devices referenced herein. The computer system 1100 may include a set of instructions 1124 that may be executed to cause the computer system 1100 to perform any one or more of the methods or computer based functions disclosed herein. The computer system 1100 may operate as a standalone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 1100 may also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions 1124 (sequential or otherwise) that specify actions to be taken by that machine. In a particular embodiment, the computer system 1100 may be implemented using electronic devices that provide voice, video or data communication. Further, while a single computer system 1100 may be illustrated, the term "system" shall also be taken to include any collection of systems or subsystems that individually or jointly execute a set, or multiple sets, of instructions to perform one or more computer functions.

As illustrated in FIG. 11, the computer system 1100 may include a processor 1102, such as, a central processing unit (CPU), a graphics processing unit (GPU), or both. The processor 1102 may be a component in a variety of systems. For example, the processor 1102 may be part of a standard personal computer or a workstation. The processor 1102 may be one or more general processors, digital signal processors, application specific integrated circuits, field programmable gate arrays, servers, networks, digital circuits, analog circuits, combinations thereof, or other now known or later developed devices for analyzing and processing data. The processor 1102 may implement a software program, such as code generated manually (i.e., programmed).

The computer system 1100 may include a memory 1104 that can communicate via a bus 1108. The memory 1104 may be a main memory, a static memory, or a dynamic memory. The memory 1104 may include, but may not be limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one case, the memory 1104 may include a cache or random access memory for the processor 1102. Alternatively or in addition, the memory 1104 may be separate from the processor 1102, such as a cache memory of a processor, the system memory, or other memory. The memory 1104 may be an external storage device or database for storing data. Examples may include a hard drive, compact disc ("CD"), digital video disc ("DVD"), memory card, memory stick, floppy disc, universal serial bus ("USB") memory device, or any other device operative to store data. The memory 1104 may be operable to store instructions 1124 executable by the processor 1102. The functions, acts or tasks illustrated in the figures or described herein may be performed by the programmed processor 1102 executing the instructions 1124 stored in the memory 1104. The functions, acts or tasks may be independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

The computer system 1100 may further include a display 1114, such as a liquid crystal display (LCD), an organic light emitting diode (OLED), a flat panel display, a solid state display, a cathode ray tube (CRT), a projector, a printer or other now known or later developed display device for outputting determined information. The display 1114 may act as an interface for the user to see the functioning of the processor 1102, or specifically as an interface with the software stored in the memory 1104 or in the drive unit 1106.

Additionally, the computer system 1100 may include an input device 1112 configured to allow a user to interact with any of the components of system 1100. The input device 1112 may be a number pad, a keyboard, or a cursor control device, such as a mouse, or a joystick, touch screen display, remote control or any other device operative to interact with the system 1100.

The computer system 1100 may also include a disk or optical drive unit 1106. The disk drive unit 1106 may include a computer-readable medium 1122 in which one or more sets of instructions 1124, e.g. software, can be embedded. Further, the instructions 1124 may perform one or more of the methods or logic as described herein. The instructions 1124 may reside completely, or at least partially, within the memory 1104 and/or within the processor 1102 during execution by the computer system 1100. The memory 1104 and the processor 1102 also may include computer-readable media as discussed above.

The present disclosure contemplates a computer-readable medium 1122 that includes instructions 1124 or receives and executes instructions 1124 responsive to a propagated signal; so that a device connected to a network 235 may communicate voice, video, audio, images or any other data over the network 235. Further, the instructions 1124 may be transmitted or received over the network 235 via a communication interface 1118. The communication interface 1118 may be a part of the processor 1102 or may be a separate component. The communication interface 1118 may be created in software or may be a physical connection in hardware. The communication interface 1118 may be configured to connect with a network 235, external media, the display 1114, or any other components in system 1100, or combinations thereof. The connection with the network 235 may be a physical connection, such as a wired Ethernet connection or may be established wirelessly as discussed below. Likewise, the additional connections with other components of the system 1100 may be physical connections or may be established wirelessly. In the case of a service provider server 240 or the content provider servers 110A-N, the servers may communicate with users 120A-N through the communication interface 1118.

The network 235 may include wired networks, wireless networks, or combinations thereof. The wireless network may be a cellular telephone network, an 802.11, 802.16, 802.20, or WiMax network. Further, the network 235 may be a public network, such as the Internet, a private network, such as an intranet, or combinations thereof, and may utilize a variety of networking protocols now available or later developed including, but not limited to TCP/IP based networking protocols.

The computer-readable medium 1122 may be a single medium, or the computer-readable medium 1122 may be a single medium or multiple media, such as a centralized or distributed database, and/or associated caches and servers that store one or more sets of instructions. The term "computer-readable medium" may also include any medium that may be capable of storing, encoding or carrying a set of instructions for execution by a processor or that may cause a computer system to perform any one or more of the methods or operations disclosed herein.

The computer-readable medium 1122 may include a solid-state memory such as a memory card or other package that houses one or more non-volatile read-only memories. The computer-readable medium 1122 also may be a random access memory or other volatile re-writable memory. Additionally, the computer-readable medium 1122 may include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that may be a tangible storage medium. Accordingly, the disclosure may be considered to include any one or more of a computer-readable medium or a distribution medium and other equivalents and successor media, in which data or instructions may be stored.

Alternatively or in addition, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system may encompass software, firmware, and hardware implementations.

The methods described herein may be implemented by software programs executable by a computer system. Further, implementations may include distributed processing, component/object distributed processing, and parallel processing. Alternatively or in addition, virtual computer system processing maybe constructed to implement one or more of the methods or functionality as described herein.

Although components and functions are described that may be implemented in particular embodiments with reference to particular standards and protocols, the components and functions are not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations described herein are intended to provide a general understanding of the structure of various embodiments. The illustrations are not intended to serve as a complete description of all of the elements and features of apparatus, processors, and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

The above disclosed subject matter is to be considered illustrative, and not restrictive, and the appended claims are intended to cover all such modifications, enhancements, and other embodiments, which fall within the true spirit and scope of the description. Thus, to the maximum extent allowed by law, the scope is to be determined by the broadest permissible interpretation of the following claims and their equivalents, and shall not be restricted or limited by the foregoing detailed description.

We claim:

1. A computer-implemented method for valuating responses in a collaborative environment, the method comprising:
    receiving, by a processor, a plurality of responses from a plurality of users based on an item provided by a content provider;
    receiving, by the processor, a plurality of ratings for each response from the plurality of users;
    determining, by the processor, a response quality score for each response if a number of the plurality of users who viewed each response satisfies a view threshold, wherein the response quality score for each response is based on the plurality of ratings received for each response and the number of the plurality of users who viewed each response;
    transforming, by the processor, each response and the response quality score of each response into a graphical representation; and
    providing, by the processor, the graphical representation to a device of the content provider.

2. The method of claim 1 wherein the response quality score of each response is determined by dividing a net rating of each response by the number of users who viewed each response.

3. The method of claim 2 wherein each rating of the plurality of ratings comprises of a negative rating or a positive rating and the net rating of each response is determined by subtracting the number of negative ratings received for each response from the number of positive ratings received for each response.

4. The method of claim 1 wherein the view threshold is satisfied for each response if the number of the plurality of users who viewed each response is greater than the number of the plurality of users who viewed an amount of the other responses in the plurality of responses.

5. The method of claim 4 wherein the view threshold is satisfied for each response of the plurality of responses if the number of the plurality of users who viewed each response is greater than the number of the plurality of users who viewed at least one-third of the other responses in the plurality of responses.

6. The method of claim 1 wherein transforming, by the processor, each response and the response quality score of each response into the graphical representation further comprises transforming, by the processor, each response and the response quality score of each response into the graphical representation if the number of users who viewed each response satisfies the view threshold.

7. The method of claim 1 wherein the graphical representation comprises a report, wherein each response which does not satisfy the view threshold is displayed with an indication that the response was not eligible to be scored.

8. A computer-implemented method for valuating responses of a user in a collaborative environment, the method comprising:
    identifying, by a processor, a collaborative environment wherein a user provides a plurality of responses based on a plurality of items provided by a plurality of content providers, and a plurality of users view the plurality of responses and provide a plurality of ratings for the plurality of responses;
    determining, by the processor, a plurality of response quality scores for the plurality of responses provided by the user;
    determining, by the processor, a user response quality score of the user based on the plurality of response quality scores for the plurality of responses provided by the user, if a quantity of the responses provided by the user satisfies a contribution threshold; and storing, by the processor in a data store, the user response quality score of the user and a user data describing the user if the quantity of responses provided by the user satisfies a contribution threshold, otherwise storing, by the processor in the data store, the user data describing the user and an indication that the user is not eligible to be scored.

9. The method of claim 8 further comprising:

retrieving, by the processor from the data store, the user response quality score of the user and the user data describing the user if the quantity of responses provided by the users satisfies the contribution threshold, otherwise retrieving, by the processor from the data store, the user data describing the user and the indication that the user is not eligible to be scored;

transforming, by the processor, at least the user data and the user response quality score, or indication that the user is not eligible to be scored, into a graphical representation; and providing, by the processor, the graphical representation to a device of an administrator.

10. The method of claim 8 wherein determining, by the processor, the user response quality score of the user based on the plurality of response quality scores for the plurality of responses provided by the user, if the quantity of the responses provided by the user satisfies the contribution threshold further comprises determining, by the processor, an average of the plurality of response quality scores for the plurality of responses provided by the user if the quantity of the responses provided by the user satisfies the contribution threshold.

11. The method of claim 8 wherein the response quality score of each response is determined by dividing a net rating of each response by a number of users who viewed each response.

12. The method of claim 11 wherein each rating of the plurality of ratings comprises of a negative rating or a positive rating and the net rating of each response is determined by subtracting the number of positive ratings received for each response by the number of negative ratings received for each response.

13. The method of claim 8 wherein the contribution threshold is satisfied for the user if the quantity of responses provided by the user is greater than a number of responses provided by an amount of other users of the plurality of users.

14. The method of claim 13 wherein the contribution threshold is satisfied for the user if the quantity of responses provided by the user is greater than the number of responses provided by at least one third of the users of the plurality of users.

15. A computer-implemented method for valuating users in a collaborative environment, the method comprising:

determining, by a processor, a contribution rank of a user of the plurality of users in a collaborative environment, wherein the contribution rank indicates a number of responses provided by the user relative to other users in the plurality of users;

determining, by the processor, a rating rank of the user of the plurality of users, wherein the rating rank indicates a number of ratings provided by the user relative to the other users in the plurality of users;

determining, by the processor, a user response quality rank of the user of the plurality of users, wherein the user response quality rank indicates a user response quality score of the user relative to the other users;

determining, by the processor, a user value of the user based on the contribution rank, the rating rank and the user response quality rank of the user; and providing, by the processor, the user value to a device of an administrator.

16. The method of claim 15 wherein determining, by the processor, a user value of the user based on the contribution rank, the rating rank and the user response quality rank of the user further comprises, determining, by the processor, the user value of the user by summing the contribution rank multiplied by 0.25, the rating rank multiplied by 0.25, and the user response quality rank multiplied by 0.5.

17. A system for valuating responses in a collaborative environment, the system comprising:

a memory to store an item, a plurality of responses and a plurality of ratings for each response;

an interface operatively connected to the memory, the interface operative to communicate with a plurality of devices of a plurality of users and a content provider; and a processor operatively connected to the memory and the interface, the processor operative to receive, via the interface, the plurality of responses from the plurality of users based on the item provided by a content provider, receive, via the interface, the plurality of ratings for each response from the plurality of users, determine a response quality score for each response if a number of the plurality of users who viewed each response satisfies a view threshold, wherein the response quality score for each response is based on the plurality of ratings received for each response and the number of the plurality of users who viewed each response, transform each response and the response quality score of each response into a graphical representation and provide, via the interface, the graphical representation to the content provider.

18. The system of claim 17 wherein the processor is further operative to determine the response quality score of each response by dividing a net rating of each response by the number of users who viewed each response.

19. The system of claim 18 wherein each rating of the plurality of ratings comprises of a negative rating or a positive rating and the processor is further operative to determine the net rating of each response by subtracting the number of negative ratings received for each response from the number of positive ratings received for each response.

20. The system of claim 17 wherein the view threshold is satisfied for each response if the number of the plurality of users who viewed each response is greater than the number of the plurality of users who viewed an amount of the other responses in the plurality of responses.

21. The system of claim 20 wherein the view threshold is satisfied for each response of the plurality of responses if the number of the plurality of users who viewed each response is greater than the number of the plurality of users who viewed at least one-third of the other responses in the plurality of responses.

22. The system of claim 17 wherein the processor is further operative to transform each response and the response quality score of each response into the graphical representation if the number of users who viewed each response satisfies the view threshold.

23. The system of claim 17 wherein the graphical representation comprises a report, wherein each response that does not satisfy the view threshold is displayed in the report with an indication that the response was not eligible to be scored.

* * * * *